(12) United States Patent
Conlon et al.

(10) Patent No.: US 10,366,086 B1
(45) Date of Patent: Jul. 30, 2019

(54) SORTING OF DEVICES FOR FILE DISTRIBUTION

(71) Applicant: Xerox Corporation, Norwalk, CT (US)

(72) Inventors: Paul Roberts Conlon, New York, NY (US); Timothy Luke Dioguardi, Webster, NY (US); Kenneth B. Schleede, Brockport, NY (US); Yolanda R. Zhesnik, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/210,159

(22) Filed: Dec. 5, 2018

Related U.S. Application Data

(63) Continuation-in-part of application No. 16/158,771, filed on Oct. 12, 2018.

(51) Int. Cl.
*G06F 7/08* (2006.01)
*G06F 16/2455* (2019.01)
*G06F 16/901* (2019.01)

(52) U.S. Cl.
CPC ............ *G06F 16/2455* (2019.01); *G06F 7/08* (2013.01); *G06F 16/9024* (2019.01); *G06F 16/9027* (2019.01)

(58) Field of Classification Search
CPC .... G06F 16/2455; G06F 7/08; G06F 16/9027; G06F 16/9024
See application file for complete search history.

(56) References Cited

U.S. PATENT DOCUMENTS

| 6,026,436 A | 2/2000 | Hawes |
| 7,987,241 B2 | 7/2011 | St Jacques, Jr. et al. |
| 2016/0116911 A1* | 4/2016 | Yamamoto .......... G06F 16/9024 700/98 |
| 2018/0081936 A1 | 3/2018 | Chen |

OTHER PUBLICATIONS

U.S. Appl. No. 16/158,771, filed Oct. 12, 2018, Schleede, et al.

* cited by examiner

*Primary Examiner* — Eric A. Rust
(74) *Attorney, Agent, or Firm* — Fay Sharpe LLP

(57) ABSTRACT

A method for sorting a group of managed devices includes querying a database of managed device with a sort query, such as an SQL query. The sort query captures an initial adjacency list in which managed devices are ordered, based on their respective parent device. Each of the managed devices is associated with a set of attributes. The initial adjacency list is sorted, e.g., using a depth-first search, based on at least one sorting criterion to generate a sorted adjacency list in which managed devices having a common parent device are reordered, based on respective attributes. The sorted adjacency list can be represented as a sorted directed graph, such as a directed tree. Modifications can be made to the sorted directed graph. A visualization of the sorted and optionally modified directed graph is output and/or a file is distributed to at least some of the managed devices, based thereon.

21 Claims, 12 Drawing Sheets

| sort index | parent device | child device |
|---|---|---|
| 1 | None | S |
| 2 | S | X3 |
| 3 | X3 | X4 |
| 4 | X3 | X5 |
| 5 | X3 | Y27 |
| 6 | X3 | Z37 |
| 7 | S | Y6 |
| 8 | Y6 | Y9 |
| 9 | Y6 | Z19 |
| 10 | Y6 | X2 |
| 11 | Y6 | Z4 |
| 12 | S | Y2 |
| 13 | Y2 | X19 |
| 14 | Y2 | Z23 |
| 15 | Y2 | Y17 |
| 16 | S | Z13 |
| 17 | Z13 | X7 |
| 18 | Z13 | Y1 |
| 19 | Z13 | X4 |
| 20 | Z13 | X13 |
| 21 | 0 | Z6 |
| (New) | | |

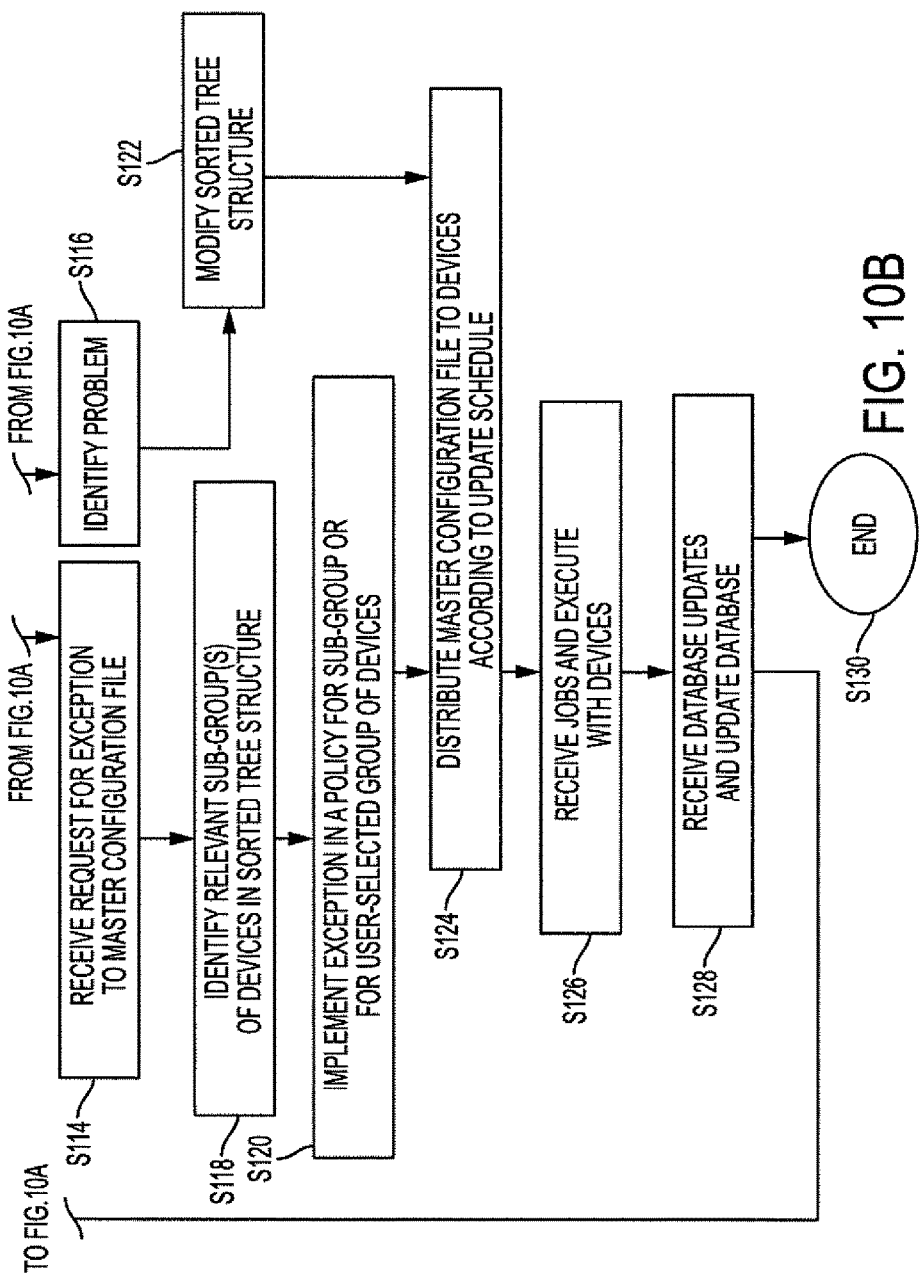

SORTING OF DEVICES FOR FILE DISTRIBUTION

This application claims the priority, as a Continuation in Part, of U.S. application Ser. No. 16/158,771, filed Oct. 12, 2018, entitled HIGHLY-SCALABLE NATIVE FLEET MANAGEMENT, by Kenneth B. Schleede, et al., the disclosure of which is incorporated herein by reference in its entirety.

BACKGROUND

The exemplary embodiment relates to a system and method for sorting data-receiving devices and finds particular application in connection with a method for distributing data files across a fleet of devices.

Computer-operated devices, such as printers and copiers, often require software updates to manage security or other settings. While larger organizations, with a large number of devices, may have a substantial, highly-trained support staff to handle these updates, such resources may be impractical for smaller organizations. It would be helpful for both small and larger organizations to be able to automate the distribution of files across a fleet of devices. Methods are being developed for managing such updates across a large fleet of devices in a corporation or other organization. Creating, distributing, and installing such files can then be performed remotely.

While the use of automated updates makes it easier for remote IT personnel to manage large fleets, all the devices are then essentially identical in settings and security features. In practice, however, different departments of an organization may have distinctive device needs that require different settings. For example, some departments may have no need for high-resolution image printing, while for others, producing documents with high quality images may be important. Thus, setting a limit on high-resolution printing for all devices would not be suitable. Similarly, some departments may be dealing with sensitive information and a personal access code may be required to be entered on a printer before a document is printed, while for other departments, such a requirement would unnecessarily delay routine printing. In some cases, the exceptions may be manually implemented, by department staff, on their local devices. However, managing these exceptions is difficult, since new update files may need to be distributed and installed on corporate fleets of devices on a frequent basis.

There remains a need for a system and method for sorting devices in a way which facilitates data distribution to the devices and device management.

INCORPORATION BY REFERENCE

The following reference, the disclosure of which is incorporated herein by reference in its entirety, is mentioned:

U.S. Pub. No. 20180081936, published Mar. 22, 2018, entitled GRAPH PROCESSING IN DATABASE, by Liang Chen, describes database middleware between graph data and underlying relational or SQL database. The middleware translates graph queries into SQL queries over related tables.

BRIEF DESCRIPTION

In accordance with one aspect of the exemplary embodiment, a method for sorting managed devices includes querying a database with a sort query. The database identifies, for each managed device in a group of managed devices, a parent device from which the managed device receives files. The sort query is used to capture an initial adjacency list in which managed devices in the group of managed devices are ordered, based on their respective parent device. Each of the managed devices is associated with a set of attributes. The initial adjacency list is sorted, based on at least one sorting criterion to generate a sorted adjacency list in which managed devices having a common parent device are reordered, based on respective attributes. The sorted adjacency list is represented as a sorted directed graph, such as a directed tree. Provision is made for modifications to be made to the sorted directed graph to generate a modified sorted directed graph. The method further includes at least one of outputting a visualization of the sorted directed graph or modified sorted directed graph on a graphical user interface; and distributing a file to at least some of the managed devices, based on the sorted directed graph or the modified sorted directed graph.

One or more of the steps of the method may be implemented by a processor.

In accordance with another aspect of the exemplary embodiment, a file distribution system includes memory storing instructions and at least one processor in communication with the memory for executing the instructions. The instructions include instructions for capturing an initial adjacency list for a database table, the database table including, for each managed device in a group of associated managed devices, a parent device from which the respective managed device receives files. The managed devices in the initial adjacency list are sorted based on the respective parent device. Each of the managed devices is associated with a set of attributes. Instructions are provided for sorting the initial adjacency list based on at least one sorting criterion to generate a sorted adjacency list in which managed devices having a common parent device are ordered based on common attributes. Instructions are provided for representing the sorted adjacency list as a sorted directed graph, such as a directed tree, which represents the ordering based on the attributes. Instructions are provided for modifications to be made to the sorted directed graph to generate a modified sorted directed graph. Instructions are provided for distributing a file to at least some of the managed devices, based on the sorted directed graph or the modified sorted directed graph.

In accordance with another aspect of the exemplary embodiment, a file distribution method includes providing a group of managed devices connected by a file distribution network, each of the managed devices being configured for receiving data files and for distributing the data files to other managed devices in the set of managed devices. A database table is provided in which, for each managed device in the group of managed devices, a parent device from which the managed device receives data files is identified. An initial adjacency list is captured from the database table in which the managed devices are ordered based on respective parent devices, irrespective of attributes of the managed devices. The initial adjacency list is sorted, based on at least one attribute-based sorting criterion, to generate a sorted adjacency list in which managed devices having a common parent device are reordered based on respective attributes. The sorted adjacency list is used for at least one of: displaying a tree structure to a user based on the sorted adjacency list; distributing a data file to at least some of the managed devices, based on the sorted adjacency list, whereby managed devices each receive the data file from a respective parent device; and collecting information from the managed devices through communications cascaded to other managed devices, based on the sorted adjacency list.

One or more of the steps of the method may be implemented by a processor.

BRIEF DESCRIPTION OF THE DRAWINGS

FIG. 5 illustrates a sorted adjacency list in which siblings are sorted based on one or more attributes;

FIG. 8 illustrates a graphical user interface for modifying the directed tree structure of FIG. 6;

DETAILED DESCRIPTION

Aspects of the exemplary embodiment relate to a system and method for sorting groups of devices which facilitates distribution of files across a fleet of devices and performing other group actions.

The system and method combine a structured query language (SQL) sort with a depth first search (DFS) to enable a representation of connected objects, in the form of a graph, such as a tree hierarchy, to be ordered within levels of the tree, based on one or more criteria. In particular, the DFS is used to visit and enumerate/label the graph objects. Recursively walking the tree to generate indexes as part of an indexing scheme. The SQL sort is used first to provide an initial grouping of the data, then the entire tree is walked via DFS, to index a pre-sorted list. While an SQL GROUP BY clause allows grouping data in relational tables, it does not provide the same result recursively traversing/walking the tree using DFS.

SQL is a domain-specific language designed for managing data held in a relational database management system (RDBMS), or for stream processing in a relational data stream management system (RDSMS). While SQL is a leading standard, other conventional database structures may be used.

The system finds application for load balancing file distribution (e.g., large software upgrade files) and minimizing or eliminating distribution node contention when many devices try to download from the same parent device. The system and method can accommodate a large fleet of devices where the parent/child (ascendant/descendant) pairings are defined. Since these connections may be submitted in any order, and devices names are often arbitrary, the tree organization is normally difficult to discern. Further, device information is often stored in a SQL database where, unless explicitly ordered with a sort clause, is out of order, and simple sorts do not properly nest/group the topology-related nodes.

To assist in file distribution and other group actions, a group of managed devices, such as image forming devices, may be considered as nodes of a directed graph, such as a tree structure, in which each device in the tree may have a parent device, zero, one or more sibling devices, and zero, one or more child devices. In a tree structure, no node has more than one parent node, which can be a root node or a descendant of the root node.

The relationships between the nodes in the tree may be encoded in a database table, which allows the devices to be sorted using queries. In many cases, however, the tree structure may be relatively flat, with large numbers of sibling nodes. The exemplary system and method provide for sorting the devices which allows groups of siblings to be identified within a graph and thus be treated differently, e.g., for file distribution.

Figure 1A:
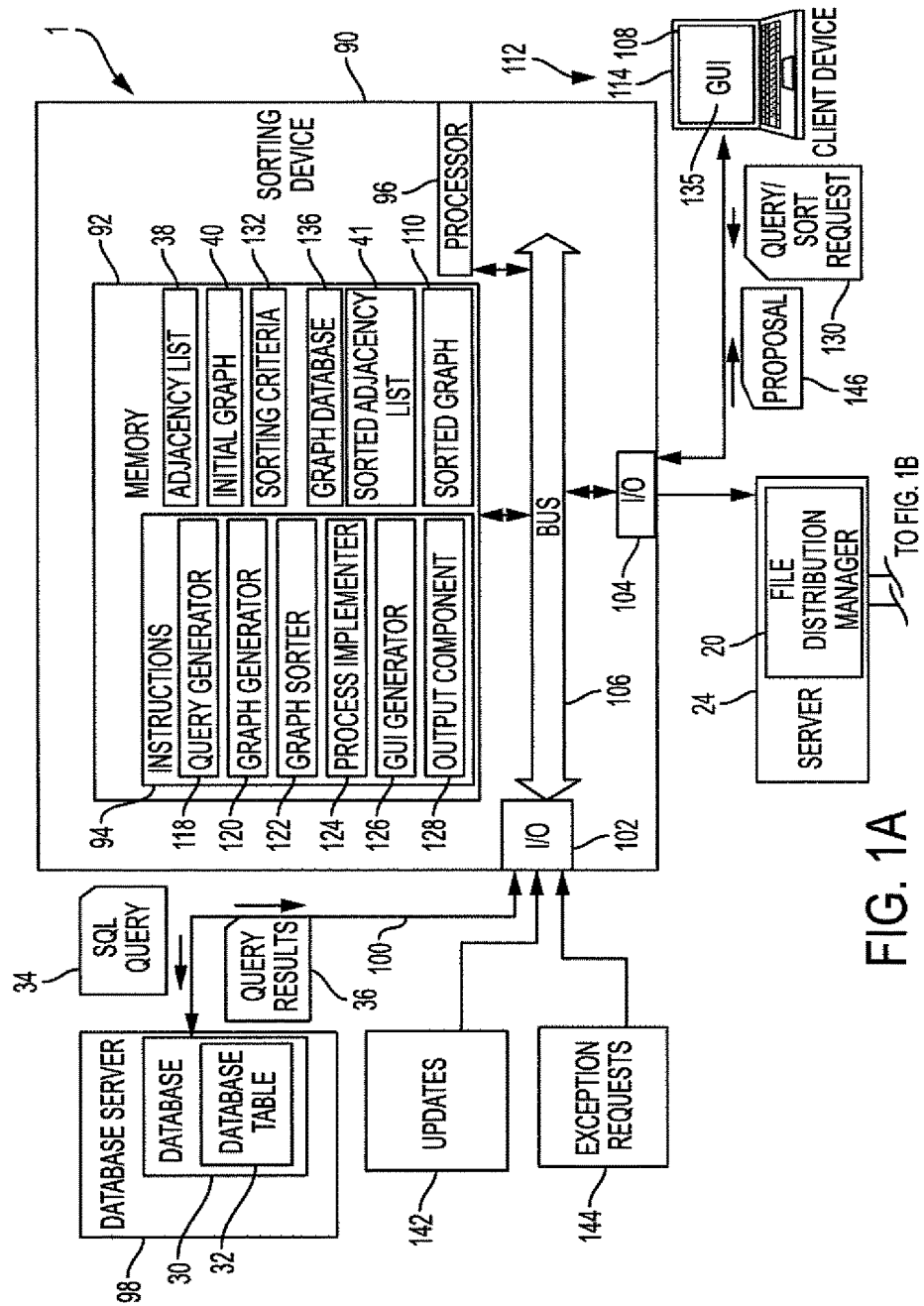
FIG. 1, which is split into FIGS. 1A and 1B for ease of illustration, is a functional block diagram of a printing system in accordance with one aspect of the exemplary embodiment.
Figure 1B:
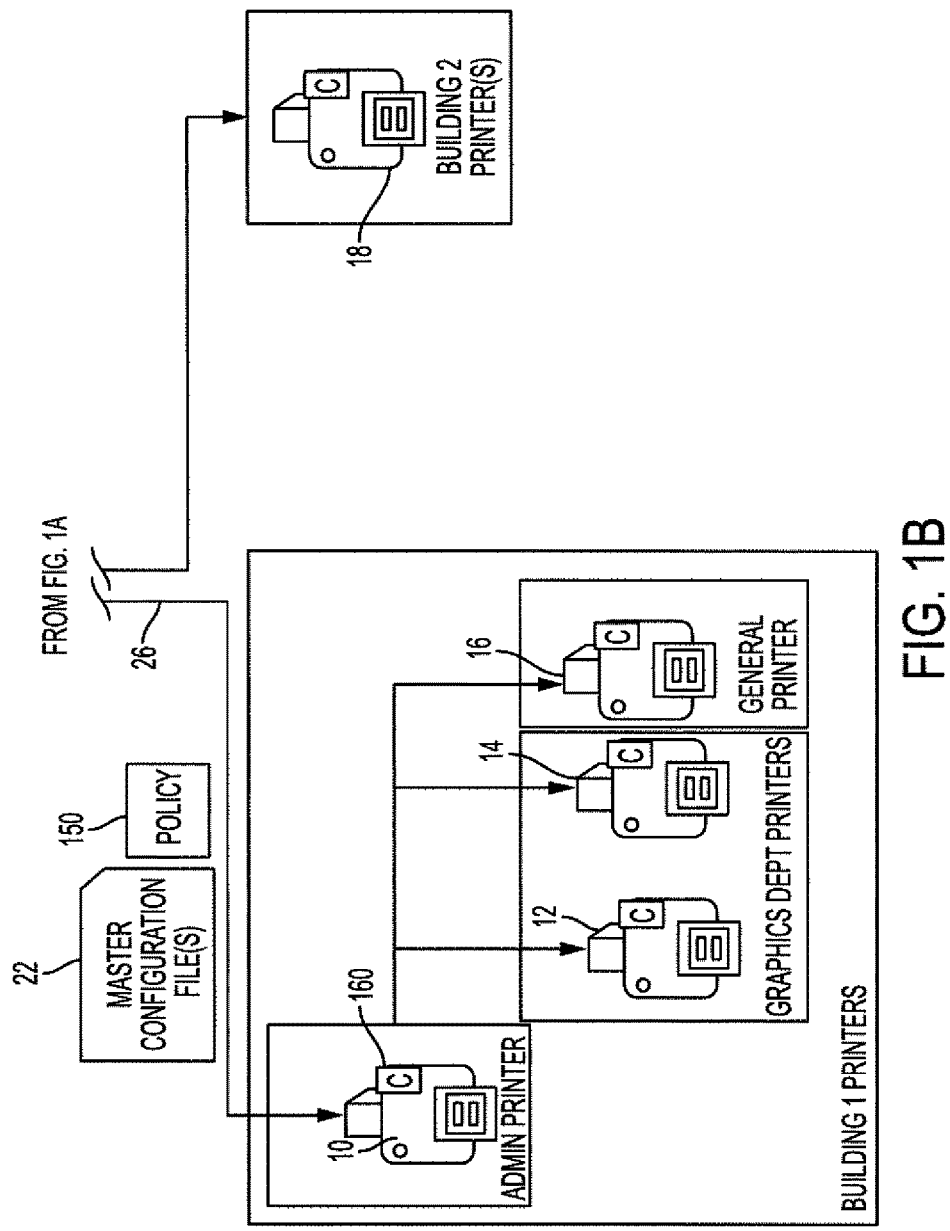

FIG. 1 (split into FIGS. 1A and 1B) illustrates an exemplary network enterprise fleet management system 1 which includes a fleet of managed devices 10, 12, 14, 16, 18, etc. While five devices are illustrated, it is to be appreciated that there may be at least 20, 50, 100, or more devices in the network. The exemplary managed devices are image forming devices, such as printers, copiers, scanners, and multi-function devices (MFDs) which perform printing as well as other functions, such as scanning and/or faxing. A fleet of such devices may be distributed across an organization, in different physical locations and/or used by people in different departments and/or having different job functions/device requirements. As a result, in some instances, it is not desirable to provide identical updates to the managed devices, across the entire fleet, although normalized configuration settings may be desirable in some cases.

A file distribution manager 20 distributes data 22 to the managed devices. The file distribution manager 20 may be resident on a server 24 or other computing device(s). The data 22, which may include updates to the managed devices in the form of master configuration files (MCF), may be distributed via wired or wireless links 26 such as a local area network, wide area network, or the like. In the case of image forming devices, the distributed files 22 may include updates to device security settings and/or settings related to the performance of one or more of printing, scanning, copying, faxing, and the like. Exemplary devices 12, 14, 16 are considered siblings of each other because they all receive the file 22 from the same parent device 10, at least in some circumstances. However, devices 12, 14 may require different settings to device 16, e.g., because they serve different roles, based, for example, on the job functions of their users. The data file 22 may also include publishing information which specifies, for each of the managed devices, the child devices to which it is to distribute the data file 22, and a time schedule for doing so. This publishing information may be stored in the managed devices and thus need only be included in the MCF 22 when changes are made (or may be sent in a separate file).

Figure 2:
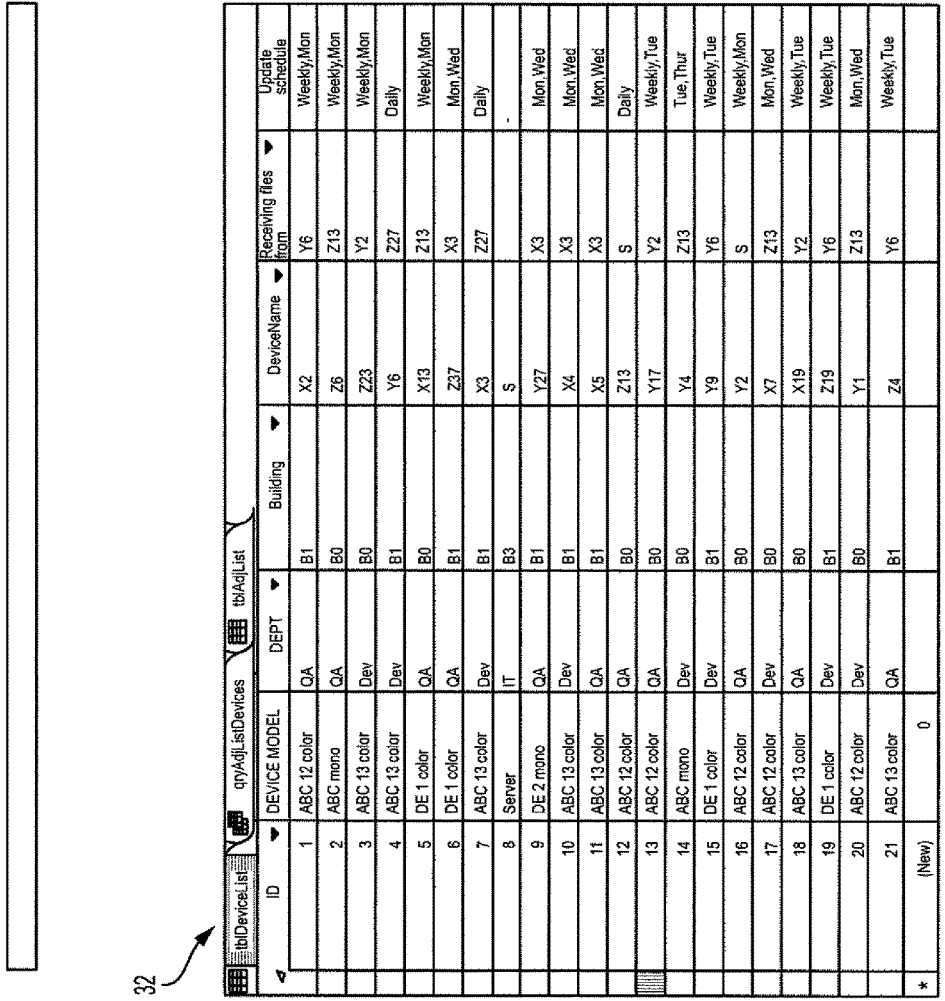
FIG. 2 illustrates an example database table.

A database 30, such as a relational database, stores information about the devices 10, 12, 14, 16, 18, e.g., in the form of one or more database tables 32 or other data structures. An illustrative database table 32, denoted tblDeviceList, is shown in FIG. 2. In general, the tables are arranged in columns (fields) and rows, each row including information, such as attributes for a particular device, or other entity. The information may be added to the database table 32 as new devices are acquired and the table may be updated when new information about the devices is obtained. At least one of the database tables 32 includes information identifying parent child relationships between pairs of devices. For example, the table shown in FIG. 2 identifies a parent device for each device, where one exists (file distribution server 24, denoted S in table 32 does not have a parent). As will be appreciated, database tables may include more, or less information than that shown in FIG. 2, and/or be linked to one or more other database tables. The parent-child relationships may be manually entered in the database and can be modified. Different parent-child relationships may be established for different types of file distribution. The parent-child relationships may be selected based on available network connections, network connection costs, network speed, device locations, download schedules and/or other user-selected criteria. For example, a user may define a tree structure which includes the parent child relationships.

Managed devices 10, 12, 14, 16, 18, etc., mentioned in a given database table each have a set of attributes listed in fields of the table or otherwise stored in memory, such as in a separate linked table. Each attribute in a given field is selected from a set of attributes. As illustrated in FIG. 2, the fields may include some or all of device name, device model, device user function (shown as DEPT), location (shown as BUILDING), and Update Schedule. The device name attribute is a unique identifier, such as an alphanumeric identifier or a more complex naming scheme may be employed, such as "Guest printer 1," "Admin printer," or a mix of IP addresses, HostNames and fully-qualified domain names (FQDNs), and so forth. The device name may be unrelated to the role of the device, thus sorting of the database table based on device name may not yield useful information about the relationships between devices. The device user function is used for indicating the general function of the users of the managed device. In the Example, some of the devices are used by people in the Quality Assurance (QA) department, while others are used by the Development (Dev) department or IT department. The location field can be used to identify respective locations of the devices (here, buildings B0, B1, and B3). The table 32 may be linked to other tables in the database, such as a table which provides some of these fields and/or different fields for each of the managed devices. While the exemplary attributes are stored in one of the database tables, the attributes may be identified from another source, such as a list or other source of information.

Returning to FIG. 1, the database 30 stores the information in a form which can be queried with queries 34, such as SQL (Structured Query Language) queries 34. A query generally specifies the database table 32 and the column or columns of the table to use in sorting. For example, an SQL ORDER BY clause is used to sort the data in ascending or descending order, based on one or more columns, using appropriate query language syntax. For example, if [ORDER BY column2, column1] is selected, the results will be sorted first according to the second column and then according to the first column. An SQL GROUP BY clause may be used to group data in the relational database table 32. This, however, results in groups of devices being sorted in the same way as devices, according to the lexicographic criteria specified for the query. The results 36 of an SQL query may be stored in the form of an adjacency list 38, or other information from which such an adjacency list 38 can be generated. The exemplary adjacency list 38 corresponds to a directed acyclic graph (a tree) 40.

In graph theory, an adjacency list is a collection of unordered sub-lists (a nested sort) used to represent a finite graph. Each sub-list includes the set of children of a node in the graph 40. The adjacency list makes it possible to programmatically "walk" (traverse) the directed tree using, for example, a recursive Depth First Search (DFS). As used herein, a sorted adjacency list 41, as described below, includes the information provided in the adjacency list 38, but also provides sorted sub-lists. In particular, managed devices having a common parent device are ordered based on common attributes in the sorted adjacency list 41.

Figure 3:
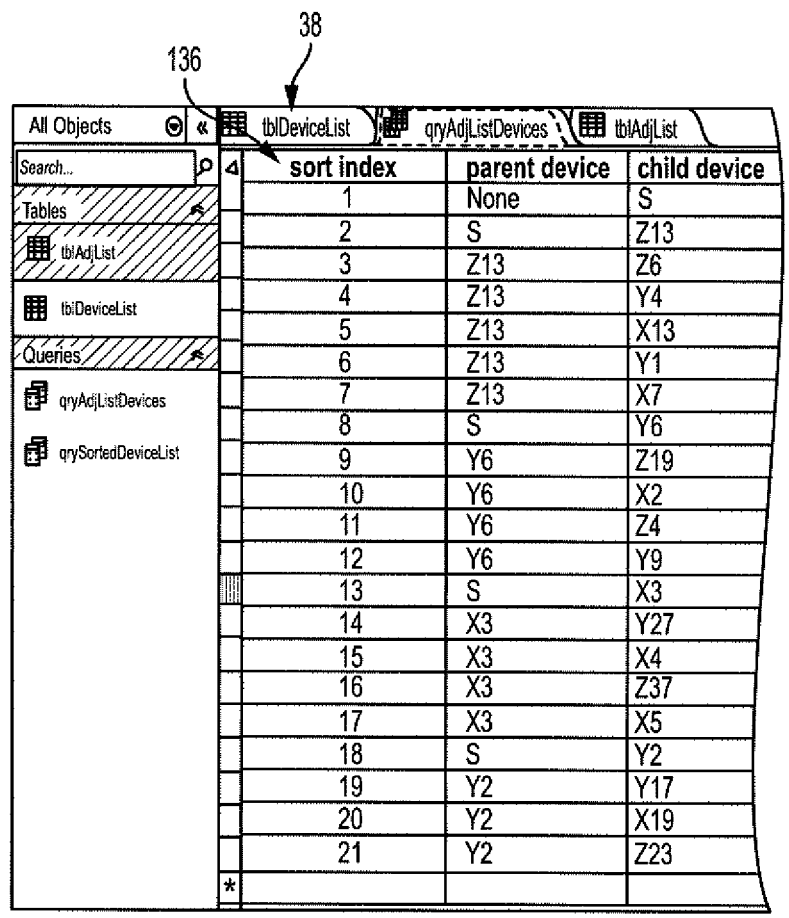
FIG. 3 illustrates an initial adjacency list generated from the database table of FIG. 2.
Figure 4:
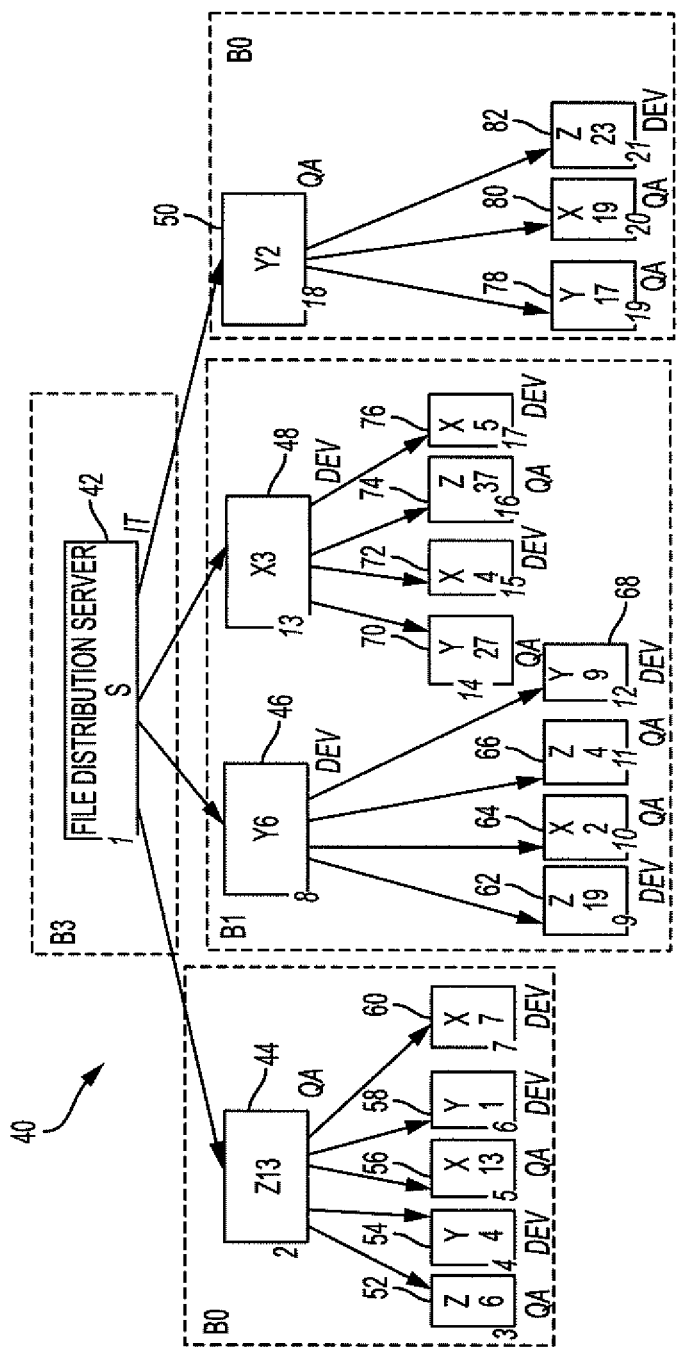
FIG. 4 illustrates an initial directed tree structure corresponding to the adjacency list of FIG. 3.

FIG. 3 illustrates an example initial adjacency list 38 which could be captured using an SQL query 34 of the database table 32 of FIG. 2. Here, an SQL query [ORDER BY column4, column3] has been used, to provide a top down sorted list of devices in which the parent device of each child device is identified. As will be appreciated, the adjacency list may include more columns (fields) of the type illustrated in FIG. 2, and/or fields containing data acquired from one or more join tables. The adjacency list 38 can be represented as an initial directed graph 40, as illustrated in FIG. 4. In FIG. 4, the initial graph 40 is in the form of a tree in which nodes represent devices and each child node has exactly one parent node. The tree structure emphasizes parent-child relationships such as that Z13 is a parent of Z6, Y4, X13, Y1, and X7, but lacks information about siblings.

The tree structure 40 includes a root node 42, the highest-level node in the tree, which in this example represents the source of the file 22, in this case, the file distribution server 24, although in some embodiments, it could be one of the managed devices. Child nodes 44, 46, 48, 50 of the root are first-level nodes, representing managed devices in the network (named Z13, Y6, X3, and Y2) which receive data files 22 directly from the file distribution server 24. Child nodes 44, 46, 48, 50 are all siblings of each other because they all have the same parent node. Child nodes 52, 54, 56, 58, 60, 62, 64, 66, 68, 70, 72, 74, 76, 78, 80, 82, are second-level nodes and receive data files 22 from their respective parent nodes 44, 46, 48, 50. Directed edges 84 of the graph each represent a parent-child relationship between the nodes connected by the edge. The illustrative tree structure 40 shown in FIG. 3 has two levels below the root node. However, there may be fewer or more than two levels, such as from 1-10 levels. For example, some of the nodes at the second level may have child nodes forming a third distribution level and so forth. For illustrative purposes, the buildings in which the devices are located are shown as dashed boxes, as well as the function of each managed device.

As shown in FIG. 1, a computer-implemented sorting device 90 has access to the database 30 and/or to information extracted therefrom, such as a sorted list 41 and/or other results of database queries 34. The computer-implemented sorting device 90 includes memory 92, which stores instructions 94 for performing the method described herein, and a processor 96, in communication with the memory, for executing the instructions. The database 30 may be stored in memory 92 and/or in a remote memory storage device 98, which is accessible by a wired or wireless link(s) 100. The sorting device 90 includes one or more input/output (I/O) devices 102, 104 for communicating with external devices, such as the database server 98 and file distribution server 24. In some embodiments, the file distribution server 24 may incorporate the sorting device 90, or vice versa. While a single file distribution manager 20/file distribution server 24 is shown, there may be two or more file distribution managers 20 on the same server 24, or on separate servers. Each file distribution manager may control file distribution to a respective set of managed devices. This maybe supported via secure APIs.

Hardware components 92, 96, 102, 104 of the sorting device are communicatively connected by a data/control bus 106. A display device 108 allows a human user to view the graph 40 and/or other information generated therefrom, such as a sorted graph 110 serving as a distribution tree. The display device may be a computer monitor of a client device 112, in communication with the sorting device. A user input device 114, such as a keyboard, keypad, touch screen, computer mouse, combination thereof, or the like, allows a user to input commands to the processor 96, e.g., for generating queries 34.

The instructions 94 include a query generator 118, a graph generator 120, a graph sorter 122, a process implementer 124, a graphical user interface (GUI) generator 126, and an output component 128.

The query generator 118 receives a request 130 for generating an SQL query, e.g., from a user or an automatically generated request, and generates an SQL query 34 therefrom, which is used to query a selected database table 32. The request 130, or a subsequent request, may include one or more sorting criteria 132, which provide a basis for sorting a generated initial graph 40. The graph generator 120 receives the results of the query, e.g., in the form of an adjacency list 38, and optionally generates an initial graph 40 therefrom. The graph sorter 122 performs an attribute-based topological sort, which sorts the initial graph 40 (and/or adjacency list 38), based on the sorting criteria 132, to generate a sorted graph 110 and/or sorted adjacency list 41. The attribute-based topological sort groups the devices in a more understandable and therefore manageable way. The GUI generator 126 generates a GUI 135 for displaying information to users, such as the sorted graph 110. The GUI may also provide a mechanism for a user to modify the sorted graph 110. The output component 128 outputs the GUI/sorted graph 110 to the client device 114/display device 112. In some embodiments, the process implementer 124 implements an automated process, based on the sorted graph 110/sorted adjacency list 41, or based on modifications thereto received from the client device 112.

Unlike conventional topological sorts, the present sorting not only sorts the tree, but drives the sorting based on sorting criteria 132 which consider features associated with the nodes of the graph, such as device attributes. The result is a combination of two sorting methods, topological sorting and standard database/SQL sorting, leveraging the advantages of both sorting methods, since both impact the sorting. The global pre-sorting in SQL, prior to the topological sort, allows a powerful/scalable SQL sort on the non-adjacency list attributes. The topological sort further sorts the tree, but the associated data has been pre-sorted/nested already. The topological sort creates a new sort index which can be incorporated into the SQL database, for final sorting in SQL.

Each of the sorting criteria 132 employed by the graph sorter 122 specifies a device attribute, or other feature, on which siblings in the initial tree 40 are to be sorted, at one or more levels of the initial tree. Different criteria may be applied to different levels. Each attribute may correspond to a respective field of the database table 32 or of a linked database table. For example, given the fields in the table shown in FIG. 2, the attributes (fields) could include one or more of "department," "building," "device name," "device model," and "update schedule." The criteria may require an alphanumeric sort, based on the attribute, or provide some other basis for sorting. The sorting criteria 132 specify the order in which the attributes are to be sorted, in a nested fashion. For example, SORT ALPHANUM[DEPT, DEVICENAME] could be an instruction to perform a nested sort first by department, then by device name, in alphanumeric order.

The database 32 may allow a variety of different sorting criteria to be used. Alphanumeric sorting is useful for readability, but sorting may occur on other/multiple attributes such as latency. Having SQL (or Graph Database) capabilities allows for many sorted views of a topology, and ordered in a comprehensible way, using any number of nested sort criteria.

The sorted tree 110 is generated by walking the entire initial tree 40, e.g., using a Depth First Search (DFS). There are three different types of depth first traversals which may be used:

1) pre-order: visit each node before visiting any of its children;

2) in-order: visit each node after visiting its left child, but before visiting its right child;

3) post-order: visit each node after visiting both of its children.

In the exemplary embodiment, the pre-order approach is used. The depth first search therefore proceeds from the top node (root 42) to the first child node 44 of the root (e.g., in a left to right order at the first level of the tree) and from the first child node 44 to its first child node 52, in the same (left-to-right) order, and so on, until a leaf node is reached (a node such as node 52 with no children). The siblings 54, 56, 58, 60 of node 52 are traversed before returning to the next highest level, where the next sibling 46 of node 44 is identified, and its children are considered.

The Depth First Search of the initial tree 40 is a more efficient sorting method than walking the tree and sorting at each level.

In an exemplary embodiment, the DFS walks the tree to create a new numeric sort index. The sort index 136 (FIG. 3) is generated by sequentially increasing a count that is inserted in a column of the adjacency list 38 as the initial tree 40 is traversed. FIG. 4 shows the sort index numbers in italics, next to the nodes. As can be seen, the root node S is given the number 1, then the first node Z13 at the first level is numbered 2, then the child nodes Z6, etc., of the first node at the first level are numbered. Since none of these has child nodes, the next node Y6 at the first level is given the next number (8), and its child nodes Z19, etc., are then identified. Then, at each level of the tree 40, the sorting criteria 132 are used to sort the nodes in each group of siblings, based on the attributes of the respective managed devices. The sorting/reordering of a set of siblings does not change the parent-child relationships.

The sort index 136 is then updated to reflect the reordering, and the adjacency list 38 is reordered, based on the updated sort index 137, to generate a sorted adjacency list 41, as illustrated in FIG. 5. This reordering of the adjacency list 38 can be performed in the SQL database 30. The sorted adjacency list 41 may be stored as a new database table.

An embedded graph database 136 may be used to manage the trees 40, 110, using standard adjacency list techniques. This creates a platform for using graph-based software tools to manage the tree. Example software tools, in addition to the graph sorter for DFS topological sorting, may include tools for:

1. Cycle detection. A tree is a simple Directed Acyclic Graph (DAG). Having loops in the tree may be problematic. Cycles in large graphs can be detected with suitable algorithms. However, in some cases, cycles could be used to ensure the integrity of the graph/tree, and make sure the files are distributed to the entire fleet.

2. Topologically related diagnostics and analysis. For example, traversing the distribution tree 110 may be performed to identify unintentionally disconnected (orphan) devices. A diagnostic utility can detect/correct any deviations in the actual fleet from what the distribution manager understands the fleet connectivity to be.

Figure 6:
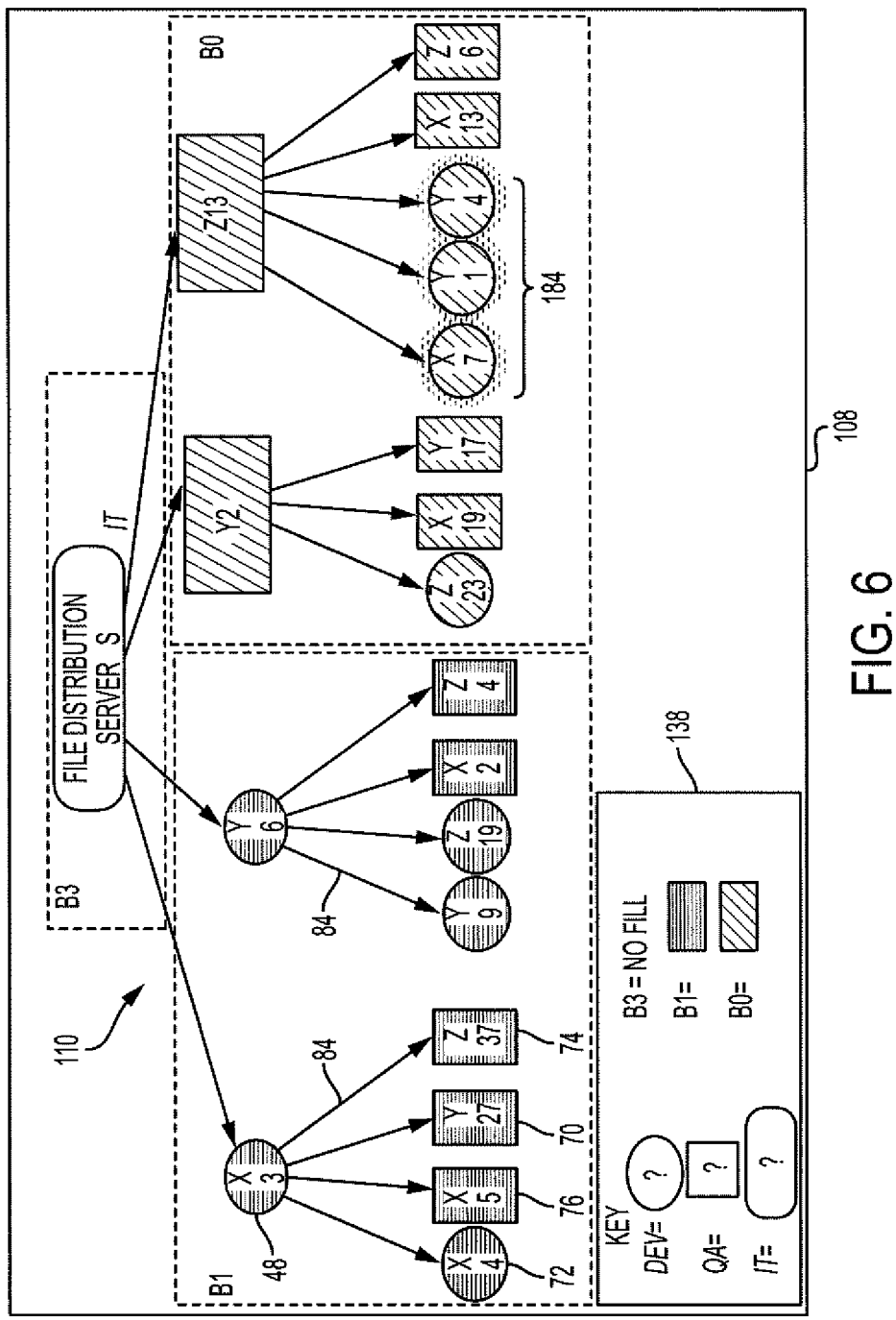
FIG. 6 illustrates a sorted directed tree structure corresponding to the sorted adjacency list of FIG. 5.

FIG. 6 illustrates an example sorted graph 110 in the form of a tree structure corresponding to the updated adjacency list 134, as it could be displayed to an authorized user. As sorting criteria, "department" and "device name" are used, for each group of siblings at each level. A first level criterion of "building," may also have been used. Where there is more than one criterion, the order in which the criterial are to be applied is specified, e.g., sort first by "department" then by "device name." The sorting applies to siblings only. No changes to parent child relationships are made. Thus, as seen in FIG. 6, while the initial tree 40 is based on the order of the database sorts, in the sorted graph 110, siblings 70, 72, 74, 76 have been reordered such that the development department device(s) 72 are listed first (in a left to right order), followed by the quality assurance department device(s) 76, 70, 74. Within each of these two groups, the devices are shown in device name order. The result is a nested sorting of the database table 32/joined tables.

A visual coding scheme may be employed which may be visible in the adjacency list and/or graphical views. For displaying the sorted subgroups on the display device 108, the nodes of the graph may be represented differently, e.g., with different shapes, colors, and/or shading of the nodes, by associating node labels or symbols with nodes, and/or using bounding boxes or specialized connecting lines denoting a subgroup of siblings and their children. A key 138 may be provided to indicate the demarcation of the nodes. Branches of the tree with latency issues may be highlighted in a particular color or otherwise visually identified.

The sorted graph 110 may permit display of collapsed (vs. exploded) groups. Given the fine-grained grouping, a group of device nodes can be collapsed and represented as a group node. Status information or other information associated with the member nodes can be propagated to the group node. Clicking on or otherwise actuating the group node explodes the group node to show its member nodes. The groups can be stored as metadata in the tree.

Figure 7:
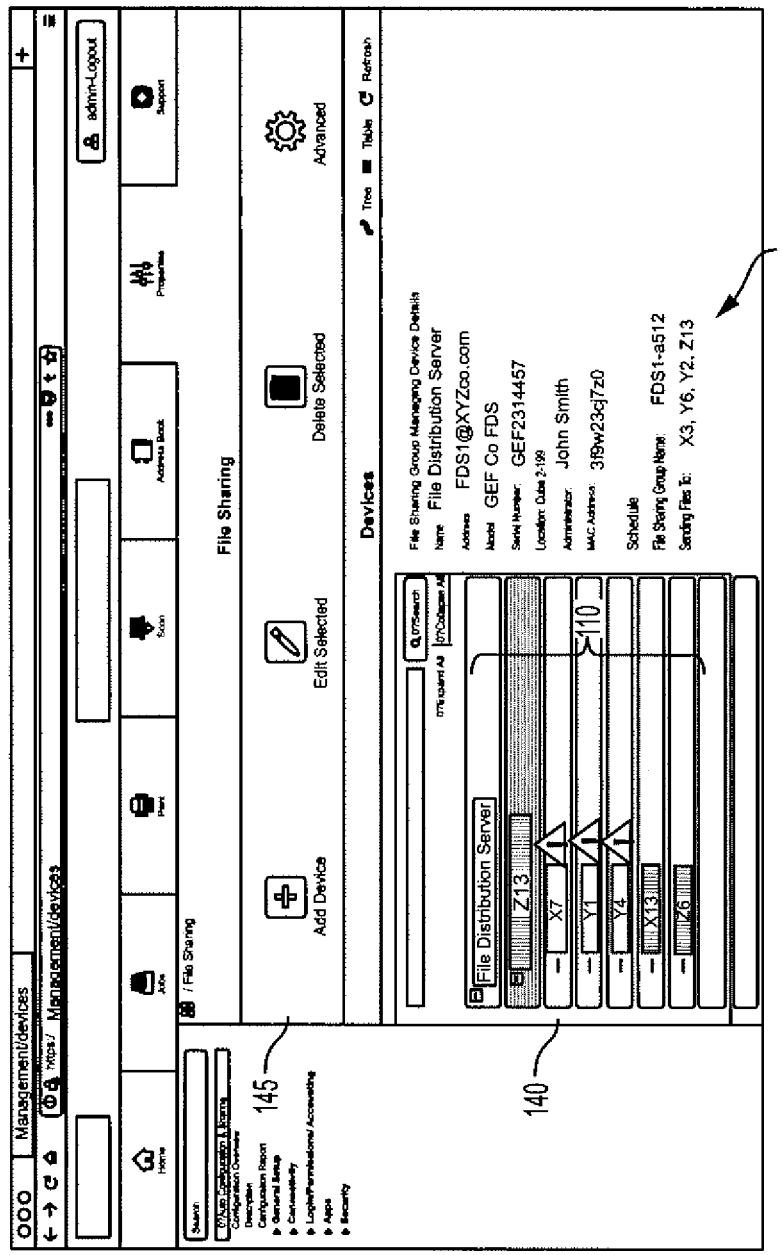
FIG. 7 illustrates a graphical user interface in which the directed tree structure of FIG. 6 is displayed through a drop-down menu.

As will be appreciated, the graph 110 may be displayed in any convenient fashion, such as via a drop-down menu 140, as illustrated in the user interface 135 shown in FIG. 7.

At intervals, the sorting device 90, database server 98, and/or file distribution server 24 may receive updates 142 and/or exception requests 144. Example updates 142 include additions/deletions of rows in the database table, changes to parent/child relationships (e.g., device 12 has been made a child of device 18, a new image forming device is being added to the graphics department devices), changes in attributes (e.g., managed device 12 has been moved to building 2, managed device 16 is to receive update files 22 twice weekly). The MCF 22 may be large files, which take a long time to transfer between devices and download. Thus, it may be desirable to modify the tree structure to take load balancing into account or to change file routing.

Figure 8:
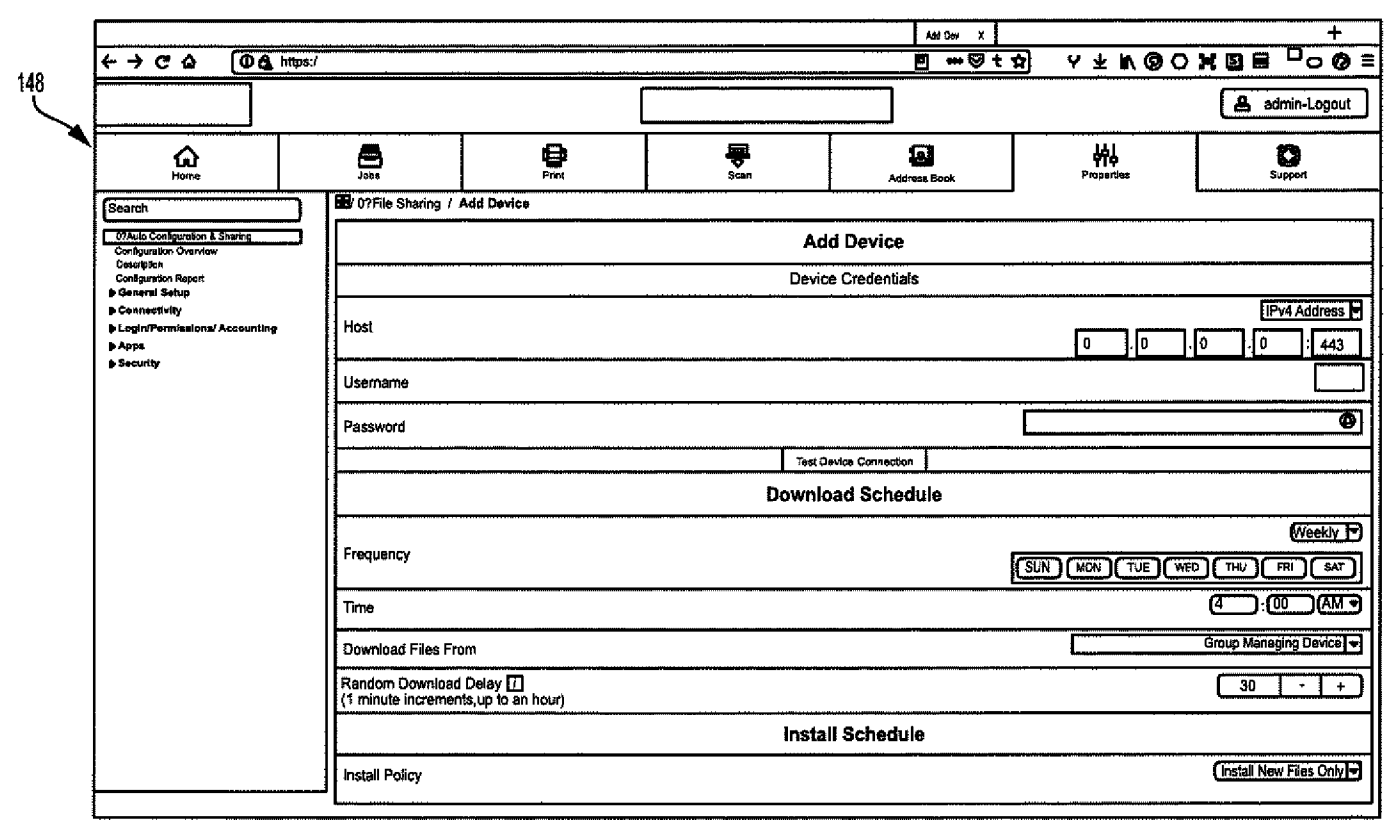

The exception requests 144 include requests from users of the devices to be provided with exceptions to a master configuration file 22, such as different security settings and so forth. The authorized user may be provided with a user interface for making changes, as illustrated at 145 in FIG. 7, which may open a new window 148, as shown in FIG. 8. For example, if the user actuated the add device button in the interface 145, the window 148 allows the user to select a device or devices to be added, select a download schedule, and other aspects, such as selecting an installation schedule. Some of the selections may have default settings, e.g., based on settings for the parent device, which the user may select to modify.

If the user opts to delete a managed device from the tree structure, the sorting device stores the children of the deleted managed device (if any) as a separate branch and may prompt the user to reconnect the branch to the updated tree structure or may automatically connect the branch to the parent of the deleted managed device. The changes are displayed in the updated tree structure 110 and may be further modified by the user. The database 30 may be updated to reflect the new parent-child connections.

The sorting device may enforce restrictions on how the user can interact with the user interface 135. For example, some operations on the distribution tree 110 may require further authentication. Protection mechanisms may be in place so that a user can only perform certain actions which maintain the integrity of the distribution tree. For example, a managed device may not be added to a given distribution tree if it is already a member of another distribution tree.

Authorized users may access the user interface 135 using a suitable login via a remote device, such as the client device 112, one of the existing fleet of managed devices 10, 12, etc., or a new managed device which is being added to the fleet of managed devices. Depending on the nature of the organization, the security requirements for authorized users may differ. In some embodiments, a user may be given a password to allow access to the user interface. In other embodiments, an access token may allow the user to have access to the user interface. Some users may have authorization for different actions. For example, adding a new device may require one level of authorization, while moving a device may be restricted to certain authorized users. Communication with the sorting device may be via a secure connection, such as HTTPS and certificates may be used to establish the secure connection.

Using the user interface at 145, a new device can be added as a member of a managed trusted community, retired devices can be deleted, or modifications to the tree structure can be made, for example, using a drag-and-drop mechanism. This makes it simple for a user to add, remove or update devices in the file distribution tree 110, including performing bulk operations on multiple devices. For example, the user can minimize or eliminate bottlenecks quickly by reconfiguring the distribution tree to introduce new levels of devices connected via a tree topology so that improved load balancing occurs. Any device can serve as a manager or member of the fleet and this designation is easily established or modified.

The user may select from different views of the tree. For example, in one view, performance issues with managed devices may be highlighted. In another, latency issues may be highlighted (how long it takes data files to be distributed to child devices).

In addition to a tree view, the user interface may allow the user to select a table view (rather like the database table of FIG. 2, but sorted) in which attributes of the managed devices are shown. For example, each row of the table may include fields for device name, device model, the managed device from which files are received, the download schedule, whether the connection to the parent device is operational, and so forth.

Other views are also contemplated, such as a file distribution view which shows which devices are currently downloading/distributing files 22.

The sorting device 90 receives a notification of changes made to the tree 110 by a user and stores the updated tree 110 in memory. The sorting device 90 may update the database table 32 to reflect any changes that affect the database. The sorting device 90 may make changes to the distributed file 22.

The sorted graph 110 may be used for implementing exceptions 144 from settings for a one-size-fits-all update file 22, allowing some groups within a corporate structure to have unique device settings to avoid inhibiting group productivity or prevent rendering the group's jobs unperformable. For example, the process implementer receives an exception request 144 from a user of device Y9 to print all documents with a high security setting (e.g., user must enter access code at the printer), by default. The process implementer 124 identifies the siblings to device Y9 which are in the same group of siblings (here, device Z19) and instructs the file distribution manager 20 to allow the file 22 to be modified for these devices, without changing the settings for the other group of siblings X2, Z4. Alternatively, the process implementer 124 sends a proposal 146 for the modification to an authorized user via the display 108 and implements the proposal if approved by the authorized user. The authorized user may accept, decline, or modify the proposal 146, which can then be implemented, e.g., through a policy 150 sent by the sorting device 90 to the file distribution server 24 and/or relayed to the appropriate devices. Groups of settings can be efficiently added to sets of devices in a single operation.

The sorted tree may also be used to automatically query the managed devices to provide a status of the managed devices. The query may be cascaded down the tree structure and responses returned up the tree structure. The query thus may be sent first to the higher-level nodes, which query their children in the order provided by the updated sort index, and return responses from the child devices back to the sorting device.

The present system 1 makes implementing exceptions to file settings less costly/resource-intensive while allowing the root (e.g., corporate IT) to track and control exceptions, through a revocable policy 150 (e.g., implemented on the master configuration file 22, a separate configuration file, or a policy installed on the devices) which shields designated devices from having certain settings changed by the master configuration file 22.

Because of the improved layout of the tree structure, administrators of the policy implementations need not be fully-trained IT personnel. Grouping/sorting can help with monitoring and/or quickly diagnosing issues because they can be viewed as a finely ordered/group set of sub/collections. In some embodiments, the policy implementation may be performed automatically, with or without user approval.

Figure 9:
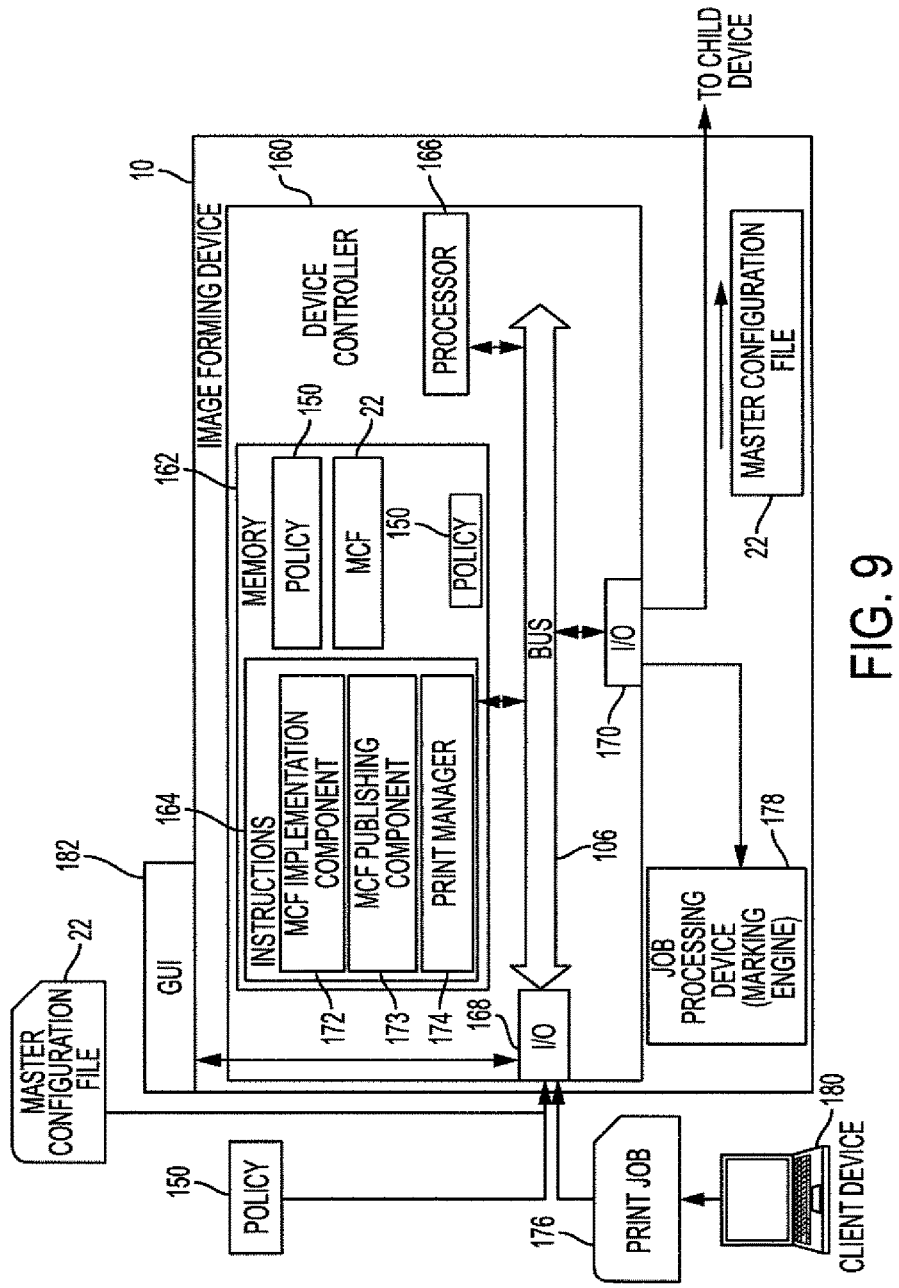
FIG. 9 is a functional block diagram illustrating an example managed device.

As illustrated in FIGS. 1 and 9, each of the managed devices 10, 12, 14, 16, 18 may include a respective device controller C 160. The device controller includes memory 162, which may store the policy 150, and instructions 164, which are implemented by an associated processor 166. The data file 22 is received from the respective parent device by an input device 168 and stored in memory 162. The policy 150 for managing exceptions for the device may be received from the parent device or directly from a higher-level device, such as the file distribution server 24. An output device 170 transmits the data file 22 (e.g., master configuration file, optionally with the policy 150) to the children of the device, if there are any. The software instructions 164 include a master configuration file implementation component 172, for implementing the data file 22 on the respective device in accordance with the policy 150, a file publishing component 173, for sending the data file 22 to the children of the managed device, in accordance with the update schedule and/or when a request for download is received from the child devices, and a print manager 174 for controlling printing or otherwise processing of received (print) jobs 176 on an associated job processing device 178. The job processing device 178 may be a marking engine, in the case of an image forming device, or may perform other job processing functions, such as faxing and/or copying, e.g., in the case of a multi-function device. In the case of a printing device, the data file 22 may thus include updates to image forming device settings, security and so forth.

Each of the managed devices 10, 12, etc., may be similarly configured, with a data file implementation component 172 and file publishing component 173. In this way, even if the managed device currently has no children in the distribution tree 110, it is ready to perform the functions of a parent device if its position in the tree 110 is changed.

The printing device 10 may receive print jobs 176 from a source device 180 (or device 112), such as a user's computing device, network server, scanner, USB device, smartphone, or the like. Each print job 176 may include one or more images, such as text, graphics, photographs, or the like, to be printed. The print manager 174 may be instructed by the implementation component 172 to control the printing (or other function of the device) in accordance with the data file 22, as modified by the policy 150 for that device. The print manager therefore controls the execution of the print jobs 176 by the marking engine 178 accordingly. The marking engine 178 includes hardware elements for rendering the digital print job images on a print media substrate, such as paper, using a marking material or materials, such as colored inks or toners and for outputting the printed sheets.

The managed device 10 may include a graphical user interface device (GUI) 182, such as a touch screen, or other display device with an associated user input device for displaying the graph(s) 40, 110 to a user and receiving commands from the user, e.g., to modify the graphs, and the like, as described for GUI 135.

The computer-implemented system 1 may include thus include one or more computing devices 24, 90, 112, 160, each of which may be a PC, such as a desktop, a laptop, palmtop computer, portable digital assistant (PDA), server computer, microprocessor, cellular telephone, tablet computer, pager, combination thereof, or other computing device capable of executing instructions for performing the exemplary method.

The memory of the illustrated computing devices 24, 90, 112, 160 may include any type of non-transitory computer readable medium such as random access memory (RAM), read only memory (ROM), magnetic disk or tape, optical disk, flash memory, or holographic memory. The input/output interfaces may comprise a modulator/demodulator (MODEM) a router, a cable, and and/or Ethernet port. The digital processors of the computing devices 24, 90, 112, 160 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 10A:
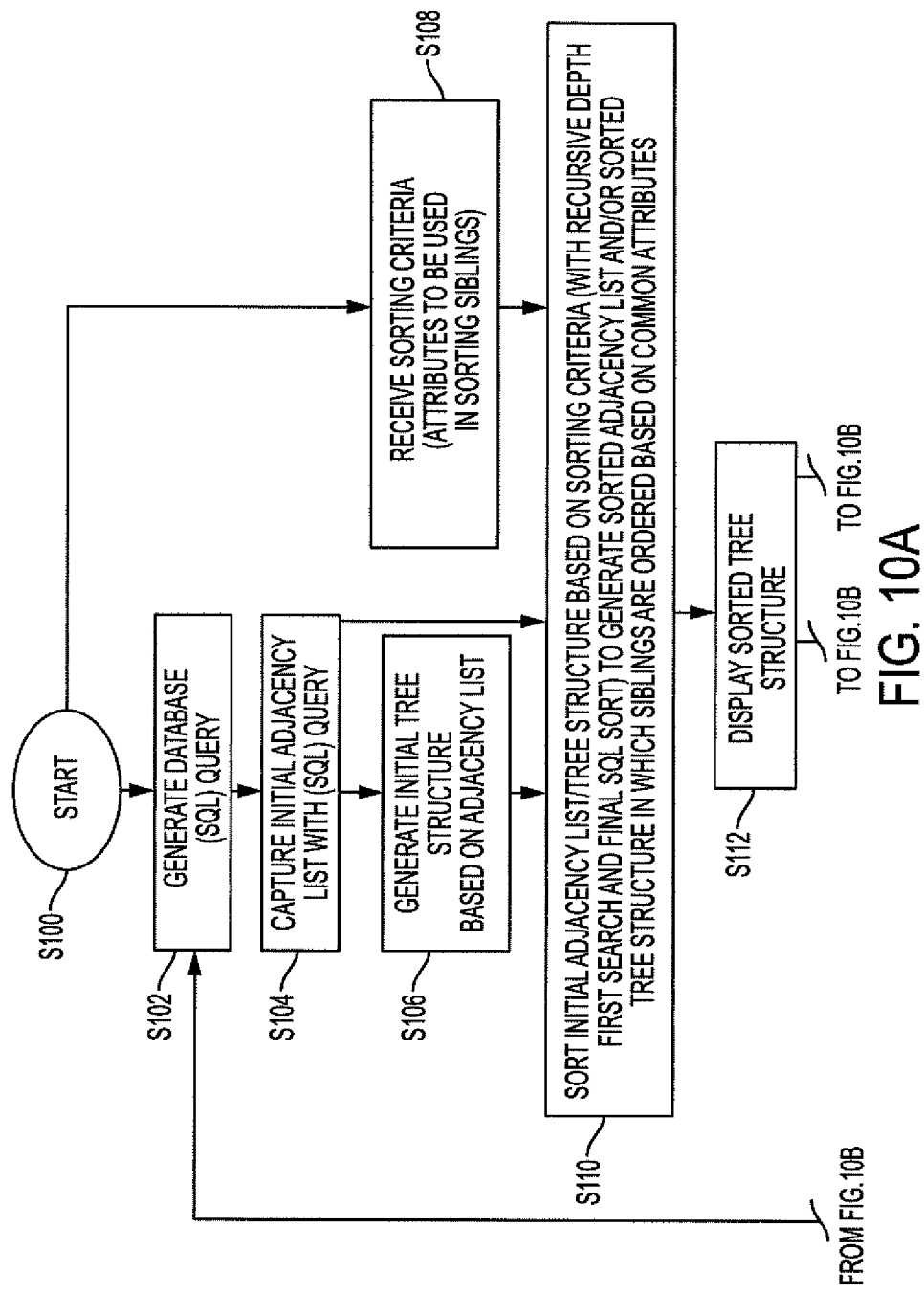
FIG. 10, which is split into FIGS. 10A and 10B for ease of illustration, is a flow chart illustrating a sorting method which may be performed with the system of FIG. 1.

FIG. 10 (split into FIGS. 10A and 10B) illustrates a method which may be implemented in the exemplary system 1. The method begins at S100.

At S102, a query 34 for accessing a database 32 is generated. The query may be an SQL query in the case of an SQL database table or a graph query in the case of a database in the form of a graph.

At S104, an adjacency list 38 is captured, based on the query 34, which provides parent-child relations sorted in a hierarchical order. This step may include capturing the adjacency list 38 from a database table or graph database and storing the captured adjacency list 38 to a new database table or graph database. Data associated with the nodes is sorted globally via SQL, with fine-grain nested sorts which give both grouping and ordering within group. The adjacency list 38 lists each of the child devices of each parent device, based on the order in which the relations between a given parent and its children appear in the database table, i.e., without requiring any particular order of the child devices.

At S106, an initial tree structure 40 is optionally generated, corresponding to adjacency list 38. The graph 40 may be generated with any suitable graph generation program, such as GraphViz™ or Windows graph visualization tools. The graph 40 may be visualized on the GUI device 182 of the MFD, or remotely, e.g., on the client device GUI 135, when managing a fleet. Web services may be used to distribute the data to these remote devices, which are configured for graphical visualization.

At S108, one or more criteria 132 for sorting the initial adjacency list 38 or initial tree structure 40 are received.

At S110, the adjacency list 38 or initial tree structure 40 is sorted, based on the received criteria, to generate a sorted adjacency list 41 and/or sorted tree structure 110. This includes a topological sort of the adjacency list 38 or initial tree structure 40 by depth first searching. In some embodiments, this includes a DFS walk to generate a sortIndex which associates a number to each of the nodes in the tree. Then for each node, the corresponding record in the SQL database is identified, and the sortIndex is added to the database table. The sort order in the database table is still the original nested SQL sort of the associated attributes. Finally, the sortIndex is sorted to provide the final graph sort order, which can be fed into a graphing tool such as GraphViz™.

At S112, the sorted tree 110 may be displayed to a user, e.g., on the GUI device 182 or client device GUI 135. The sorted tree structure 110 identifies sub-groups of siblings having common attributes, based one or more of the sorting criteria 132.

At S114, a request 144 for an exception to a master configuration file 22 may be received for one of the devices.

In some embodiments, at S116, a user, the sorting device 90, or file distribution manager 20 may identify a problem in the distribution tree 110, such as with the distribution of MCF files 22. The user can use the sorted tree to identify regions of the file distribution network where problems are occurring, which may be visually highlighted for the user on the tree, based on information fed back from the managed devices. For example, device Z13 may not be able to distribute the MCF file 22 to all its children within a preselected time period, due to its processing capacity.

At S118, using the sorted tree structure 110, a sub-group of devices, which includes the device for which the exception is requested or for which a problem is identified, either automatically, or by an authorized user navigating the tree.

At S120, in the case of an exception, the exception is implemented for the subgroup of devices. In some embodiments, this may include proposing the subgroup to an authorized user via the GUI 135 on the display device 108, and implementing the proposal, as modified by the user. For example, as illustrated in FIG. 6, if an exception request is received from a registered user of device Y1, the subgroup 184 of sibling devices X7, Y1, Y4 may be proposed, e.g., by highlighting or otherwise visually identifying the subgroup 184 in the tree 110. A group node can be generated, which in a collapsed view, subsumes/replaces the subgroup. The exception is then implemented by a policy 150 communicated to the relevant devices.

In the case of a problem being detected at S116, at S122, a process may be implemented to correct the problem. In the example above, sorting device process implementer 124 may be called on to identify subgroups of Z13's children which could receive the file 22 on different schedules, and propose updating or automatically update the update schedules in the database table 32 accordingly. Or, the authorized user may implement the changes manually, via the user interlace 146, thereby generating an updated distribution tree 110.

At S124, a master configuration file 22 is automatically distributed to all (or a subset) of the devices, in accordance with the update schedule and the current distribution tree 110. The policy 150 controls how the MCF is implemented on the subgroup 184 of devices and/or other user-selected group of devices.

The distribution may include various safeguards for ensuring correct installation and timely distribution. First, the MCF 22 is distributed to a first level device or devices, in accordance with the update schedule. The MCF 22 received by these devices may be downloaded to a staging area where the files are verified for integrity prior to installation. If there are any issues, the file is not installed and errors are communicated to the distribution server 20 either directly, or indirectly via a parent device. After installation of the file 22 (including any reboots), the file will only be shared with downstream child devices if the installation is successful. Since a file is typically redistributed within the distribution tree, separate staging and sharing repositories may be used. After successful installation, files are moved to the sharing area and made available whereby connected child devices may now download any successfully installed files per their respective schedules. Status information on the progress of installation and further distribution is communicated to the managing root device 20 for monitoring and problem resolution, as needed. The distribution status between downstream parent/child devices is also shared. This enables modifications to be made in the distribution, if needed. For example, rerouting may be performed, for example, if one of the managed devices is offline. As part of the distribution, each managed device may have native contention management and randomization of schedules to minimize concurrent downloads and reduce the likelihood of device download request collisions. With large files 22 (e.g., product software upgrades) limiting concurrent requests and downloads ensures a parent is not overloaded by processing requests. To control distribution, the system can securely enable/disable any managed device. When disabled, this prevents communication with other devices and suspends distribution of files by the disabled device.

At S126, jobs 176 to be executed by the devices are received and executed by the respective devices in accordance with the MCF 22, as modified by the policy 150. The exemplary jobs are print jobs, which are received by the printing devices 10, 12, 14, 16, 18 and printed. However, for other electromechanical devices, other types of jobs may be performed by the devices, such as copying, faxing, molding, machining, stamping, or the like.

At S128, updates to the database table 32 may be received and the database table updated accordingly. The method may return to S102 for regenerating the sorted adjacency list 41 and/or graph 110.

The method ends at S130.

The method illustrated in FIG. 10 may be at least partially implemented in a computer program product or products that may be executed on a computer or computers. The computer program product(s) may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing a part of the flowchart shown in FIG. 10, can be used to implement the method. As will be appreciated, while the steps of the method may all be computer implemented, in some embodiments one or more of the steps may be at least partially performed manually.

As will be appreciated, the steps of the method need not all proceed in the order illustrated and fewer, more, or different steps may be performed.

The system and method thus provides a hybrid sorting method, using the database 32 for initial sorting, and then using DFS to walk the adjacency list to create a new grouping which arranges devices in a more understandable ordering.

The system and method can be used to address a variety of problems in existing Managed Print Services (MPS) servers, which are often complicated and costly to set up. For example, users can modify the sorted tree structure 110 through a graphical user interface, e.g., for improved file distribution to reduce bottlenecks. The GUI 135 may allow the user to select sub-groups of devices 184 to receive files 22 on a common schedule, or to ensure that two subgroups of siblings are on different schedules. Updates to the database 32, which may affect parent-child relations, update schedules, and other attributes, are quickly incorporated into a sorted tree structure 110, which a user can review.

The system and method can be adapted to focus on different attributes of the devices, e.g., by updating queries to change the data involved and the sort order, which avoids the need for complex code changes.

While the method can be used to implement on-demand sorting, in some embodiments, the database table 32 itself may be updated to reflect the sort order in the sorted adjacency list 41. This may include reordering rows in the database table according to the sort order. Dynamic queries may be performed periodically, creating a new database table with the final sort orders. This may benefit performance by allowing on-demand queries to refresh the sorting, which may be quicker. The software (implementation component 172) for implementing the MCF 22 and for publishing the MCF to child devices can be retrofitted to existing devices in a network or built-in for new devices. The simplicity provided can lower barriers to entry for many customers in managing their devices automatically. Currently it is prohibitive for many businesses to manage a fleet of devices. This provides and enabling set of capabilities that allows the organization greater capability for self-managing devices without depending external support groups.

While the exemplary method employs a database 32 to store the relationships between devices and their attributes, other sortable collections that permit nested sorts and DFS may be used.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for sorting managed devices, comprising:
    querying a database with a sort query, the database identifying, for each managed device in a group of managed devices, a parent device from which the managed device receives files, the sort query being used to capture an initial adjacency list in which managed devices the group of managed devices are ordered, based on a respective parent device, each of the managed devices being associated with a set of attributes;
    sorting the initial adjacency list, based on at least one sorting criterion, to generate a sorted adjacency list in which managed devices having a common parent device are reordered, based on respective attributes;
    representing the sorted adjacency list as a sorted directed graph;
    providing for modifications to be made to the sorted directed graph to generate a modified sorted directed graph; and
    performing at least one of:
        outputting a visualization of the sorted directed graph or modified sorted directed graph on a graphical user interface; and
        distributing a file to at least some of the managed devices, based on the sorted directed graph or the modified sorted directed graph.

2. The method of claim 1, wherein the sort query is an SQL query.

3. The method of claim 1, wherein the managed devices comprise at least five managed devices.

4. The method of claim 1, wherein the managed devices comprise image forming devices.

5. The method of claim 1, wherein at least one of the attributes of the managed devices is selected from the group consisting of device model, device name, device user function, location, and update schedule.

6. The method of claim 1, wherein the sorting of the initial adjacency list includes performing a depth first search of the initial adjacency list or of an initial graph generated therefrom.

7. The method of claim 1, wherein the sorting of the initial adjacency list includes generating a sort index for the managed devices in the initial adjacency list using an indexing scheme, based on the reordering of groups of nodes, and generating the sorted adjacency list based on the sort index.

8. The method of claim 1, wherein the sorted directed graph is a tree.

9. The method of claim 1, wherein the providing for modifications to be made to the sorted directed graph comprises displaying the directed graph to a user in a graphical user interface.

10. The method of claim 9, further comprising receiving a request for an exception to the file for at least one of the managed devices and providing for a user to manage the exception through the graphical user interface.

11. The method of claim 10, wherein the exception is implemented through a policy which is communicated to the managed device.

12. The method of claim 1, wherein at least some of the modifications are selected from the group consisting of: deleting a device, adding a device, changing a parent of a managed device, and changing an attribute of a managed device.

13. The method of claim 1, wherein in the sorted directed graph, nodes of the sorted directed graph represent managed devices, each node being connected, directly or indirectly, to a root node representing a source of the file.

14. The method of claim 13, wherein the distributing of the file to the managed devices comprises distributing the file to a first of the managed devices, which is a parent of a second of the managed devices in the sorted graph, and distributing the file to the second managed device from the first managed device.

15. The method of claim 1, wherein the sorted adjacency list is further sorted after writing to an SQL table.

16. The method of claim 1, wherein the sorting criteria include at least two sorting criteria, whereby nodes having a common parent are grouped based on a first of the criteria and within each group, ordered based on a second of the criteria.

17. A computer program product comprising a non-transitory recording medium storing instructions, which when executed on a computer, cause the computer to perform the method of claim 1.

18. The method of claim 1, wherein the method includes distributing a file to at least some of the managed devices, based on the sorted directed graph or the modified sorted directed graph.

19. A file distribution system comprising:
memory storing instructions for:
    capturing an initial adjacency list for a database table, the database table including, for each managed device in a group of associated managed devices, a parent device from which the managed device receives files, the managed devices in the adjacency list being sorted based on the respective parent device, each of the managed devices being associated with a set of attributes;
    sorting the initial adjacency list based on at least one sorting criterion to generate a sorted adjacency list in which managed devices having a common parent device are ordered based on common attributes;
    representing the sorted adjacency list as a sorted directed graph which represents the ordering based on the attributes;
    providing for modifications to be made to the sorted directed graph to generate a modified sorted directed graph; and
    providing for distributing a file to at least some of the managed devices, based on the sorted directed graph or the modified sorted directed graph; and
at least one processor in communication with the memory for executing the instructions.

20. The system of claim 19, comprising the managed devices.

21. A file distribution method comprising:
providing a group of managed devices connected by a file distribution network, each of the managed devices being configured for receiving data files and for distributing the data files to other managed devices in the set of managed devices;
providing a database table in which, for each managed device in the group of managed devices, a parent device from which the managed device receives data files is identified;
capturing an initial adjacency list from the database table in which the managed devices are ordered based on respective parent devices, irrespective of attributes of the managed devices;
sorting the initial adjacency list based on at least one attribute-based sorting criterion to generate a sorted adjacency list in which managed devices having a common parent device are reordered based on respective attributes; and
providing for using the sorted adjacency list for:
    displaying a tree structure to a user based on the sorted adjacency list;
    distributing a data file to at least some of the managed devices, based on the sorted adjacency list, whereby managed devices each receive the data file from a respective parent device; and
    collecting information from the managed devices through communications between managed devices that are cascaded to other managed devices, based on the sorted adjacency list.

* * * * *